US006163756A

United States Patent [19]

Baron et al.

[11] Patent Number: 6,163,756

[45] Date of Patent: Dec. 19, 2000

[54] SYSTEM AND METHOD FOR DETECTING AND DISPLAYING WIND SHEAR

[75] Inventors: Robert O. Baron; Gregory S. Wilson, both of Huntsville; Ronald J. Phillips, Madison; Tom S. Thompson, Athens; Paul J. Meyer, Huntsville, all of Ala.

[73] Assignee: Baron Services, Inc., Huntsville, Ala.

[21] Appl. No.: 09/175,911

[22] Filed: Oct. 20, 1998

[51] Int. Cl.[7] .......... G06F 169/00

[52] U.S. Cl. .......... 702/3

[58] Field of Search .......... 702/3, 4, 5; 342/26, 342/460; 340/968, 949; 706/931; 73/170.11, 170.16, 170.12, 170.14; 345/958

[56] References Cited

U.S. PATENT DOCUMENTS

| | | | |
|---|---|---|---|
| 4,873,481 | 10/1989 | Nelson et al. . | |
| 5,135,397 | 8/1992 | Yen . | |
| 5,239,623 | 8/1993 | Sato et al. . | |
| 5,255,190 | 10/1993 | Sznaider . | |
| 5,262,773 | 11/1993 | Gordon . | |
| 5,262,782 | 11/1993 | Rubin et al. . | |
| 5,281,815 | 1/1994 | Even-Tov . | |
| 5,315,297 | 5/1994 | Cornman | 340/968 |
| 5,317,689 | 5/1994 | Nack et al. . | |
| 5,339,085 | 8/1994 | Katoh et al. . | |
| 5,363,475 | 11/1994 | Baker et al. . | |
| 5,379,215 | 1/1995 | Kruhoeffer et al. . | |
| 5,409,379 | 4/1995 | Montag et al. | 434/2 |
| 5,432,895 | 7/1995 | Myers | 345/419 |
| 5,490,239 | 2/1996 | Myers | 345/429 |
| 5,517,193 | 5/1996 | Allison et al. | 342/26 |
| 5,523,759 | 6/1996 | Gillberg et al. . | |
| 5,583,972 | 12/1996 | Miller . | |
| 5,598,359 | 1/1997 | Montag et al. . | |
| 5,630,718 | 5/1997 | Montag et al. . | |
| 5,648,782 | 7/1997 | Albo et al. . | |
| 5,717,589 | 2/1998 | Thompson et al. . | |

*Primary Examiner*—Donald E. McElheny, Jr.
*Attorney, Agent, or Firm*—Lanier Ford Shaver & Payne P.C.; David L. Berdan; Frank M. Caprio

[57] ABSTRACT

A computer based method of detecting and displaying rotational wind shear. Radial wind velocities within first and second adjacent gate sweeps produced by a radar system are detected in a predetermined geographic area, and are compared at points of equal radial distance from the radar system. The radial location of gate to gate wind shear at positions between the radar system and the boundary of the radar systems range are identified and compared to a predetermined threshold wind velocity value to determine the location of high priority gate to gate wind shear. The high priority gate to gate wind shear is then graphically displayed relative to its geographic location on a graphical representation of the predetermined geographic area. A computer based system for detecting and displaying rotational wind shear is also disclosed.

23 Claims, 5 Drawing Sheets

62

60

SYSTEM AND METHOD FOR DETECTING AND DISPLAYING WIND SHEAR

BACKGROUND OF THE INVENTION

This invention relates generally to weather broadcasting and display systems, and more particularly to a method for detecting and displaying areas of dangerous wind shear that may result in tornadic activity.

BRIEF DESCRIPTION OF THE PRIOR ART

For many years people have relied on weather broadcasts to help plan their lives. According to Robert Henson in his book, *Television Weathercasting: A History*, weather "consistently ranks as the top draw in both local and national news (when featured in the latter)." According to a poll conducted by the National Oceanic and Atmospheric Administration in 1980, weather was "the major reason that people watch the news programs."

The field of meteorology has seen significant technological advances in the past few years. New and innovative devices such as Doppler radar, thunderstorm detectors, and wind and temperature profiles have all helped meteorologists better understand and predict weather. However, despite the advances in ways to measure meteorological activity, the television broadcast of this information has seen few advances. The typical current weathercast display represents the weather symbolically rather than realistically and usually only shows the general air temperature and the location of precipitation. In some instances, a superimposed satellite display of fluffy cloud patterns is shown moving along over the flat map from an exaggerated height observation point. The "blue screen" display behind the announcer still usually shows the familiar two-dimensional patchwork rainfall amounts in red, yellow, green and blue. The satellite imagery displayed on the evening broadcast may be anywhere from a half-hour to four hours old.

Also significant is the information that is absent from the conventional weathercast display, such as: (1) the type of precipitation, (2) the strength and location of wind shear, (3) the presence of tornadic signatures showing rapid circular motion, (4) the location of updraft vault, (5) the location of wall clouds, (6) the location of heavy lightning activity, and (7) the wind direction on the ground.

The National Weather Service has a network of advanced S-Band radar stations in place at 138 sites in the United States, and is capable of delivering 77 different products to government meteorologists. These products include; winds aloft, lightning activity and wind shear conditions, such as microburst activity. However, of these 77 products, only 11 are commercially available through contract with several private weather service companies which act as intermediaries between the National Weather Service and the public. These companies charge for the use of these eleven products and, in order to receive the latest radar (NEXRAD) information from a particular site, a private individual or company pays a monthly fee to receive the radar signal.

There are several patents, which disclose various system utilizing wind shear information to detect microburst and wake turbulence.

Albo et al., U.S. Pat. No. 5,648,782 discloses a fuzzy logic processing system to detect atmospheric microburst events. The purpose of the Albo patent is to identify microburst activity, which is usually undectable to the human eye, as opposed to tornadic or storm gust fronts which are perceptible without aid of instrumentation.

Gordon, U.S. Pat. No. 5,262,773 discloses a method and apparatus for detecting specialized meteorological conditions such as microbursts and wake turbulence generated by aircraft. The system is used by flight controllers to observe the severity of wind conditions in close proximity to aircraft runway, to assist with takeoffs and landings.

The present invention is distinguished over the prior art in general, and these patents in particular, by providing a weather-casting system for detecting wind shear and determining the possibility of dangerous twisting winds, so that potentially hazardous weather conditions can be identified and broadcast to television viewers in real time. The present invention will identify microburst activity, but is more particularly directed toward the formation of circular wind activity that may indicate a tornado, and the present invention relates to broadcasting this information to television viewers.

SUMMARY OF THE INVENTION

It is therefore an object of the present invention to provide a computerized method of detecting and displaying dangerous wind shear wherein wind velocities are detected by a weather radar, and the velocities are processed to determine the location of wind shear exceeding a predetermined threshold value. The wind shear locations are then graphically displayed and may be broadcast in connection with a television weather cast.

It is a further object of this invention to provide a means for prioritizing which wind shear locations are graphically displayed by examining ancillary conditions such as the location of additional wind shear, the proximity of the wind shear to a storm cell, and the atmospheric conditions above and below the wind shear location.

It is another object of this invention to provide a weather display system capable of displaying the location of dangerous wind shear. The system comprises a weather radar useful for measuring wind velocities and data processing means for analyzing the wind velocities and determining the existence and location of wind shear exceeding a predetermined value. The data processing means may also prioritize the wind shear locations based upon user-defined conditions, and graphically display only the high priority wind shear.

DESCRIPTION OF THE PREFERRED EMBODIMENT

Figure 1:
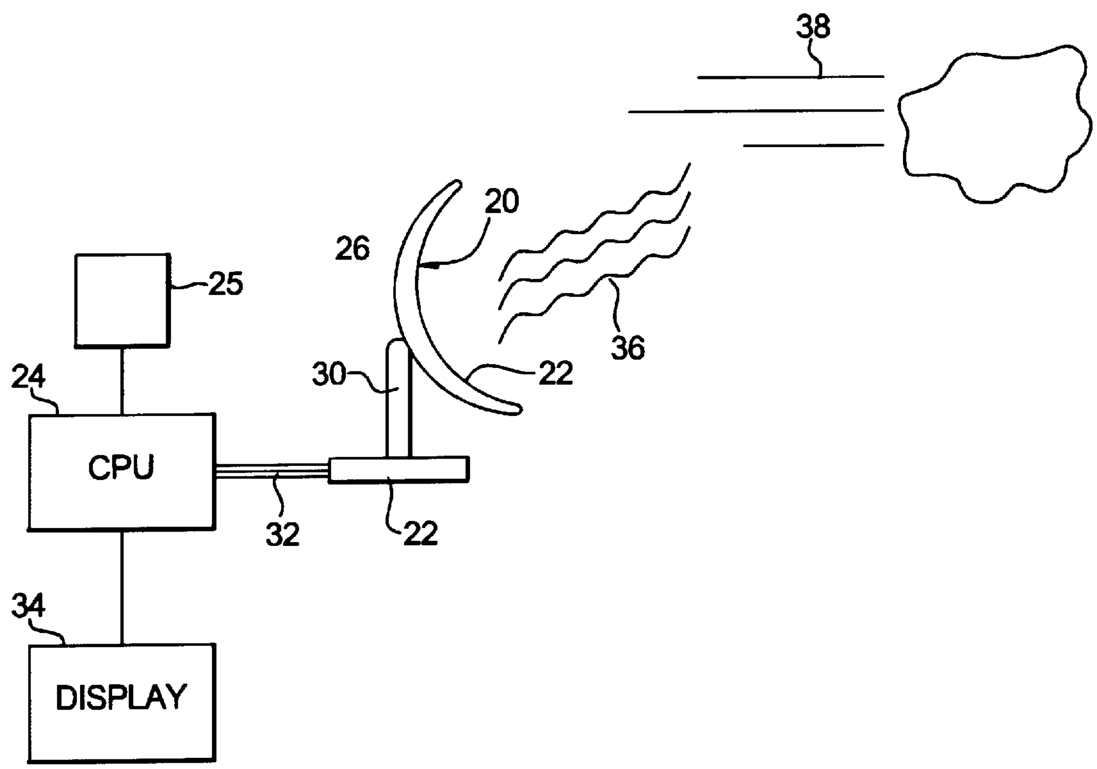
FIG. 1 depicts a radar station having a central processing unit configured for use with the present invention.

The present invention utilizes a Doppler radar station to detect radar echos and produce signals that are representative of atmospheric and meteorological phenomena. Referring to FIG. 1, a wind velocity detection apparatus 20 is shown, having a radar system 22 and a processing unit 24. Radar system 22 is any conventional radar emitting and detection system that is capable of measuring wind velocities and including antenna 26 which is continuously rotated by drive mechanism 30. The preferred radar systems are X-band or C-band Doppler radar currently used by many television stations across the U.S. The basic operation of the radar system 22 is well known to those of skill in the art.

Processing unit 24 is operably connected with the radar system 22 by communication leads 32. Processing unit 24 may be configured to vary the beam width and gate sweep of radar system 22 because processing unit 24 governs the operation of radar system 22. The gate sweep Processing >unit 24 is connected to display 34 for the graphical presentation of radar-derived information and to data base 25 for accessing geographic data stored in database 25 and preferably corresponding to the predetermined geographic area or coverage area 50 (FIG. 3) of radar system 22.

In operation, radar system 22 emits radio signals 36 and, in turn, receives corresponding reflected signals 38 that represent atmospheric conditions such as storm activity and wind velocities. The reflected signals 38 are received at antenna 26, converted to electrical pulses or signals that represent the reflected signals 38, and transferred to processing unit 24 along communication leads 32. Processing unit 24 produces a radial image of the reflected signals 38 representing the atmospheric conditions. The method for processing the weather data is well known to those of skill in the art.

Figure 3:
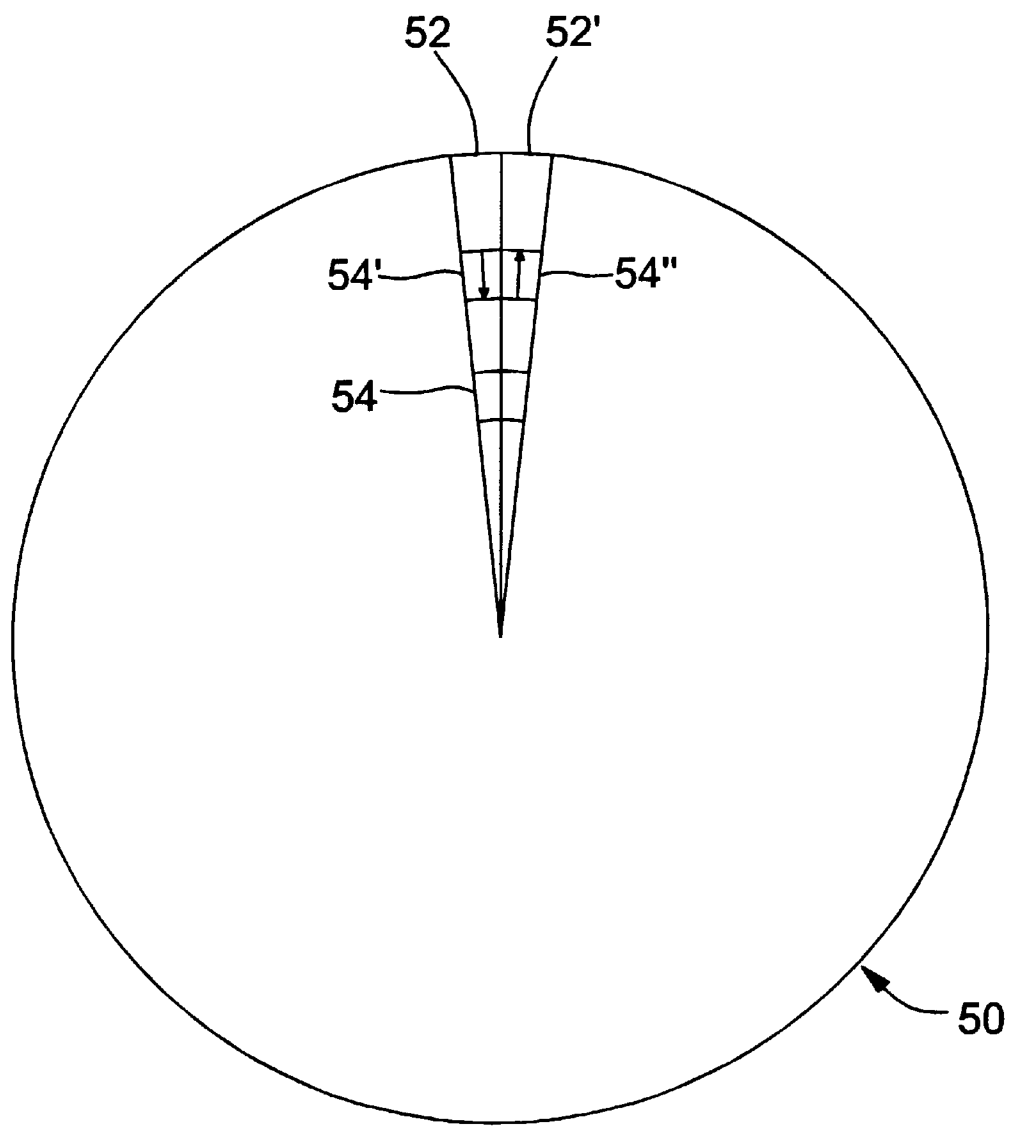
FIG. 3 is a graphical representation of wind shear as measured by a radar of the present invention.

FIG. 3 is a graphical representation of the type of radial information produced from radar system 22 in combination with processor 24. The circle 50 represents the coverage area of the radar system 22. The two slices of the circle, 52 and 52' represent two gate sweeps of the radar. The gate sweeps are further divided into grid block elements 54 by the processor 24. For each grid block element 54, the processor assigns a wind velocity value based upon the information received from the radar system 22. The radar is only capable of measuring the speed of wind coming towards the radar and moving away from the radar, it does not measure wind movement perpendicular to the path of the radar beam. For example the wind velocity of two side-by-side grid blocks are opposite (one towards the radar and one away from the radar) this is known as wind shear. In FIG. 3 wind shear is illustrated by the measurement of opposite wind velocities in grid block elements 54' and 54''.

Figure 4:
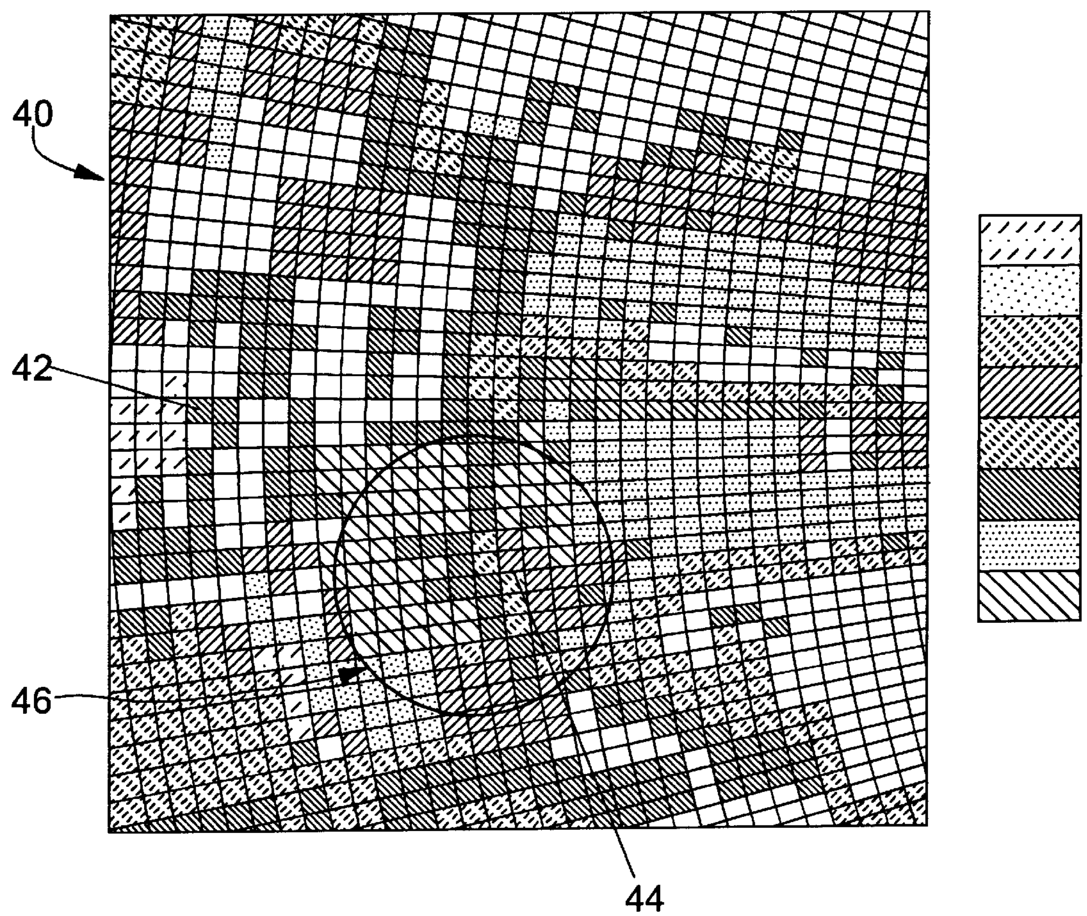
FIG. 4 is representative of a method for graphically displaying wind velocities measured from a typical weather radar.

FIG. 4. depicts a conventional radial velocity image 40 derived from the radar system 22 data. The radar screen depicts the grid block elements 42 created by the processor 24. Each grid block element 42 is assigned a color based upon the velocity data calculated for that block. The circled area 46 indicates an area of both positive and negative wind velocities relative to the radar, and the grid block elements identified as 44 indicate a high gate-to-gate wind shear.

Figure 2:
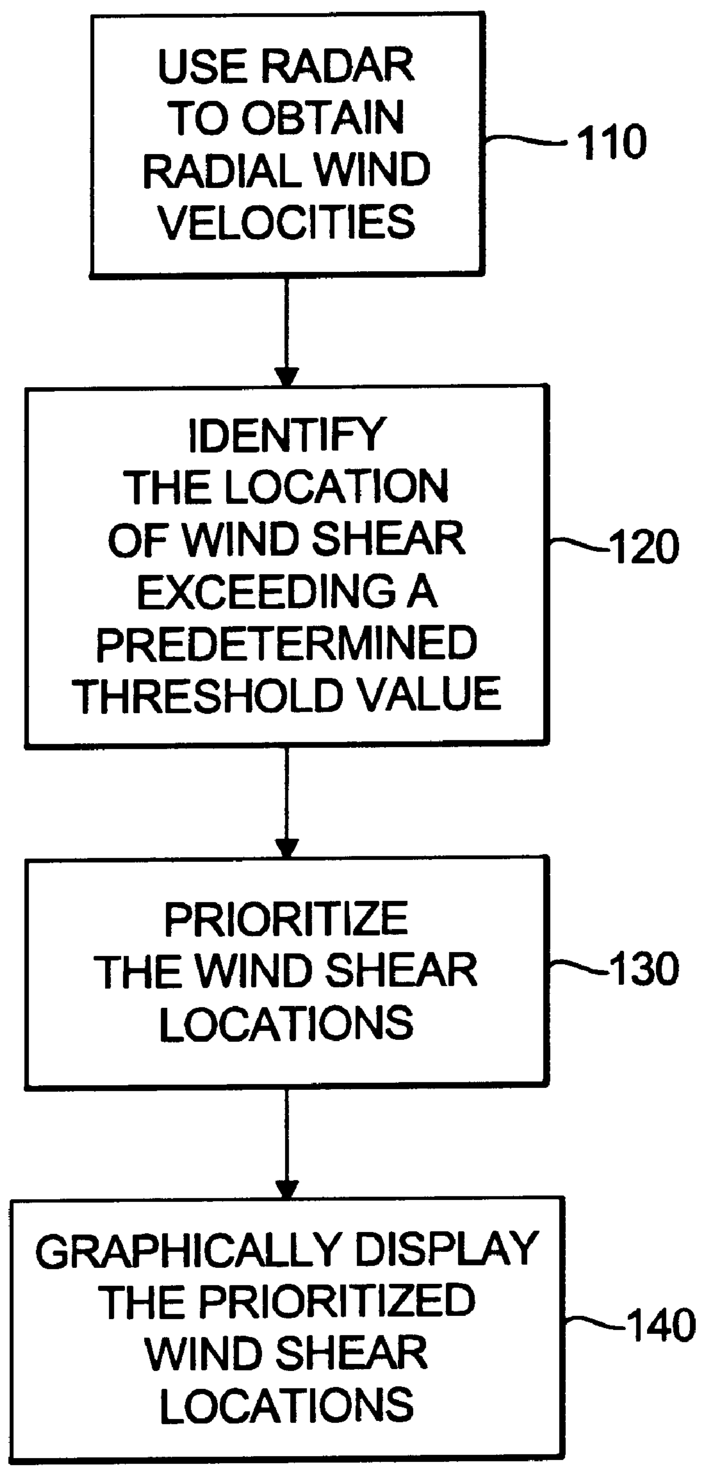
FIG. 2 is a block diagram illustrating the basic stages of the present invention for collecting and displaying weather data.

Referring now to FIG. 2, a block diagram of the method embodied in the present invention is shown. The first step 110 is using a radar system to obtain radial wind velocities for a pre-selected geographic region. This step of the method is set forth in the preceding paragraphs, and is well known to those of skill in the art.

The second step 120 is identifying the location of gate-to-gate wind shear of a predetermined threshold value. In this step the processor 24 is programmed to identify those areas of wind shear that have a total velocity difference above a predetermined value. For example, if a threshold value of 40 knots, the preferred embodiment, is selected, the system will identify any area in which the difference between the wind velocity of one grid block and the adjacent grid block equals or exceeds 40 knots. The presence of such wind shear provides an early indication of possible tornadic activity. This step can be further refined by producing a measurement of derivative wind velocity values. A second wind velocity screen similar to that illustrated in FIG. 4 may be prepared by measuring the gate to gate derivative wind velocities. This will help illustrate areas that have multiple sites of wind shear, which are of more concern, and perhaps eliminate the isolated incidents of wind shear. The user may also be allowed to set up the derivative screen to display the derivative wind velocities of several grid blocks in a row, to further refine this step of the process.

The next step 130 is prioritizing the wind shear locations based upon additional conditions. If the system merely marked all incidence of wind shear, the final display screen would typically show hundreds of wind shear marks for a given geographic location. Experience has shown that not all wind shear events are significant to the weather viewing public. The primary purpose of the wind shear determination is to locate potential areas of tornadic, storm wall, or microburst activity. To prioritize the areas of high wind shear, several other conditions are considered. First, the presence of multiple wind shear locations is significant, particularly adjacent wind shear which indicates that winds are swirling in a counterclockwise direction. In the Northern Hemisphere, tornadoes generally twist counterclockwise (obviously, if the system were used in the Southern Hemisphere, it should be modified to indicate clockwise rotation). Next, the wind shear's proximity to a storm cell is significant, as dangerous wind twisting or micro bursts rarely occur apart from a storm cell. The familiar hook signature of a meso-cyclic activity of a storm would also be very significant. Finally, the wind conditions above and below the identified wind shear should be detected to determine the depth of the wind shear or circular movement. If the wind shear is isolated in one level of the atmosphere, it is less likely to develop into a dangerous twisting situation than windshear which is spread through multiple levels. Other conditioning factors may be added by the user to identify the important incidence of wind shear to be displayed to the viewer.

Figure 5:
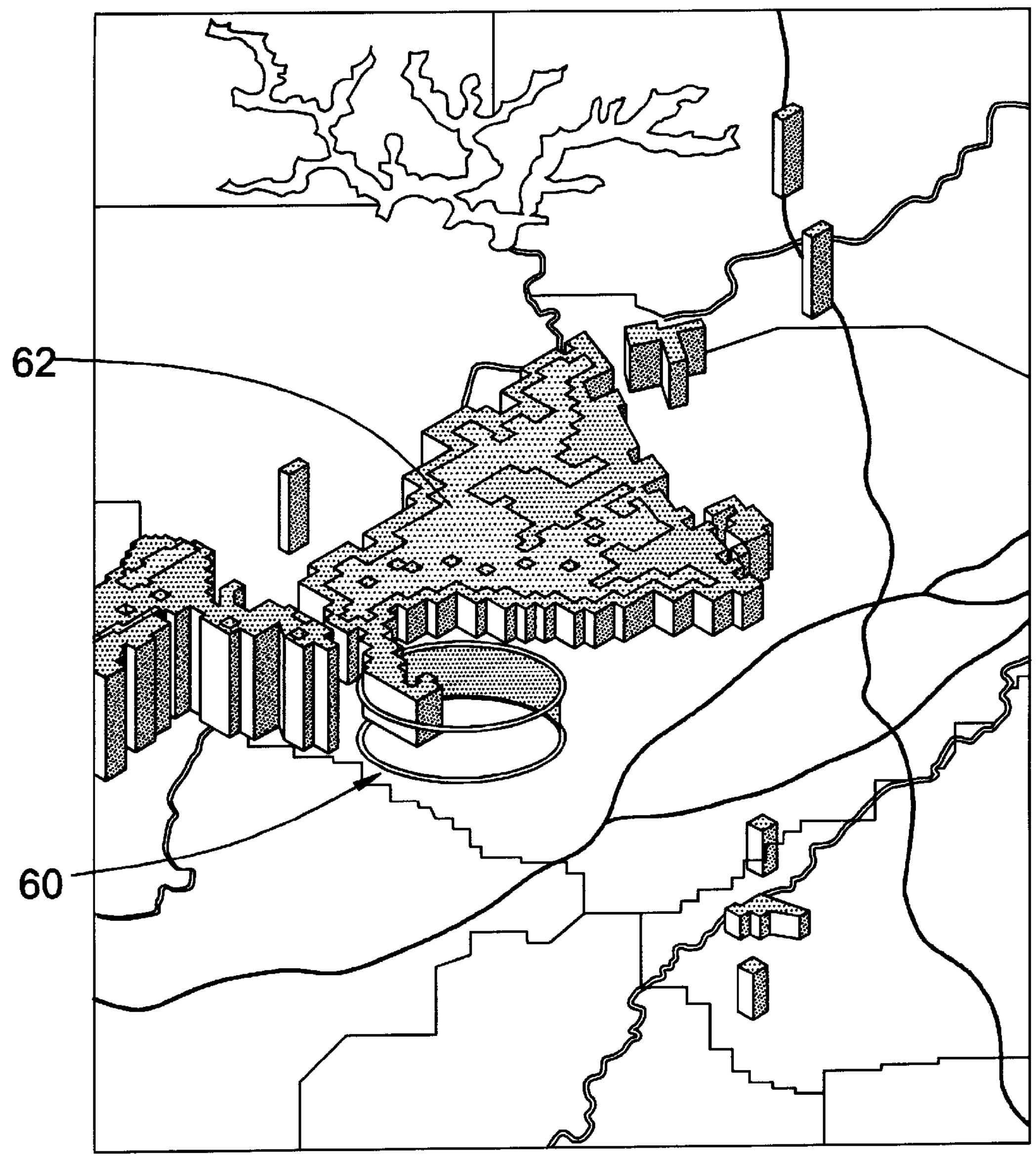
FIG. 5 is an illustration of the output from the present invention.

The final step 140 is graphically displaying the location of the prioritized wind shear, such as the by using "shear markers." Shear markers are animated swirling circles which are a trademark of Baron Services, Inc. A graphical representation 64 of the geographic area covered by the radar system 22 will be necessary so that viewers may readily identify the location of the dangerous wind shear. In addition, the wind shear markers are preferably displayed in conduction with the typical storm cell information, so that the viewers can see where the dangerous swirling winds are in relation to a given storm. An example of the graphic representation 64 is shown in FIG. 5. FIG. 5 shows the shear markers 60 displayed in three-dimensional perspective, along with a three-dimensional representation of a storm cell 62 which is a recent innovation in weather-casting. Both are shown here positioned on a graphical representation 64 of the predetermined geographic area covered by radar system 22. However, one of skill will readily recognize that the shear markers are equally useful in the more familiar two-dimensional format.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

We claim:

1. A computer based method of detecting and displaying rotational wind shear, said method comprising the steps of:

a) detecting radial wind velocities within first and second adjacent gate sweeps produced by a radar system positioned in a predetermined geographic area;

b) comparing said radial wind velocities within said first gate sweep to adjacent said radial wind velocities within said second gate sweep at points of equal radial distance from said radar system;

c) identifying the radial location of gate to gate wind shear between said radar system and the boundary of said radar system's range;

d) comparing the identified gate to gate wind shear to a predetermined threshold wind velocity value to determine the location of high velocity gate to gate wind shear; and e) graphically displaying the geographic location of the high velocity gate to gate wind shear relative to a geographic representation of the predetermined geographic area in graphical form.

2. The method of claim 1 wherein said detecting step comprises the step of receiving retrieved radar signals with a single radar.

3. The method of claim 1 wherein said detecting step comprises the step of receiving reflected radar signals indicative of a storm cell, and wherein step e) includes the step of displaying a graphical representation of said storm cell.

4. The method of claim 1 wherein said gate to gate wind shear comprises winds circumferentially adjacent one another traveling in opposite radial directions, and wherein said comparing step includes the step of calculating the difference in velocity between said adjacent winds.

5. The method of claim 1 wherein said gate to gate wind shear comprises winds circumferentially adjacent one another and traveling in the same radial direction at different velocities, and wherein said comparing step includes the step of calculating the velocity difference between said adjacent winds.

6. The method of claim 1 further comprising the step of calculating the gate to gate derivative wind velocities to determine the presence of multiple sites of gate to gate wind shear.

7. The method of claim 6 further comprising the step of displaying the gate to gate derivative wind velocities.

8. The method of claim 7 wherein step d) comprises the step of prioritizing the gate to gate wind shear based upon one or more user defined conditions.

9. The method of claim 8 comprising the step of repeating steps a)–d) for multiple levels of the atmosphere above and below the identified gate to gate wind shear.

10. A computer based system for detecting and displaying rotational wind shear, said system comprising:

a) a radar system including an antennae having a circumferential coverage area, said antennae positioned in a predetermined geographic area to detect radial wind velocities within its coverage area;

b) a database including geographic data corresponding to and representative of the predetermined geographic area;

c) a central processing unit communicating with said radar system to receive information therefrom corresponding to the radial wind velocities, said central processing unit instructed to divide the circumferential coverage area into a plurality of adjacent gate sweeps and to compare radial wind velocities detected in one of said plurality of gate sweeps with radial wind velocities detected in an adjacent gate sweep at locations radially equidistant from said radar system to determine the location of gate to gate wind shear, said central processing unit configured to compare the determined gate to gate wind shear with a predetermined threshold value to identify the high velocity gate to gate wind shear and to communicate with said database to associate the high velocity gate to gate wind shear with the geographic data; and d) a display device communicating with said central processing unit to graphically depict the high velocity gate to gate wind shear together with the geographic data to provide an indication of the location of the high velocity gate to gate wind shear within the predetermined geographic area.

11. The computer based system of claim 10 wherein said radar system comprises a single dopplar weather radar selected from the group consisting of C-band or X-band doppler weather radar.

12. The computer based system of claim 10 wherein the predetermined threshold value comprises 40 knots, and wherein said central processing unit is further configured to further prioritize said high velocity gate to gate wind shear based upon user selected conditions.

13. The computer based system of claim 12 wherein said user defined conditions comprise the direction of swirl of the wind.

14. The computer based system of claim 12 wherein said radar system is configured to detect the location of a storm cell, and wherein said user defined condition comprises the proximity of the high velocity gate to gate wind shear to the storm cell.

15. A computer based method for the detection and graphic display of atmospheric conditions indicative of tornadoes, said method comprising the steps of:

a) receiving reflected signals from a radar operating in a predetermined geographic area, said reflected signals including radial wind velocity data for a plurality of adjacent radar gate sweeps;

b) comparing the received radial wind velocity data of first and second adjacent gate sweeps at points of common radial distance from said radar to identify locations where there exists a difference in velocities;

c) processing the radial wind velocity data associated with the locations identified in said comparing step to identify regions where the difference between the radial wind velocity data of the first and second adjacent gate sweeps exceeds a predetermined threshold value indicative of tornadic activity, said regions comprising high velocity twisting winds;

d) combining a graphical representation of said high velocity twisting winds with stored geographic data representative of the predetermined geographic data; and e) displaying the product of said combining step in graphical form on a display device.

16. The method of claim 15 wherein said receiving step comprises the step of detecting said reflected signals with a single radar.

17. The method of claim 16 wherein said receiving step further comprises the step of receiving reflected signals indicative of a storm cell, and wherein said displaying step includes the step of depicting the storm cell together with the product of said combining step.

18. The method of claim 15 wherein said gate to gate wind shear comprises winds circumferentially adjacent one another and traveling in opposite radial directions, and wherein said processing step comprises the step of calculating the velocity difference between said adjacent winds.

19. The method of claim 15 wherein said gate to gate wind shear comprises wind circumferentially adjacent one another traveling in the same radial direction at different velocities, and wherein said processing step comprises calculating the velocity difference between said adjacent winds.

20. The method of claim 15 further comprising the step of calculating the gate to gate derivative wind velocities to determine the presence of multiple sites of high velocity twisting winds.

21. The method of claim 20 further comprising the step of displaying the gate to gate derivative wind velocities using shear markers.

22. The method of claim 21 wherein said processing step comprises the step of prioritizing the gate to gate derivative wind velocities based upon one or more user defined conditions.

23. The method of claim 15 further comprises the step of repeating steps a)–d) for multiple levels of the atmosphere above and below the high velocity twisting winds.

* * * * *